(12) United States Patent
Zellermann et al.

(10) Patent No.: US 8,884,449 B2
(45) Date of Patent: Nov. 11, 2014

(54) DEVICE FOR ENERGY RECOVERY FOR A LARGE DIESEL ENGINE

(75) Inventors: Rudolf Zellermann, Hamburg (DE); Michael Lutz, Rothemühle (DE); Mario Schenzer, Hamburg (DE); Peter Steinhoff, Buchholz (DE); Heinz-Hugo Bösch, Buchholz (DE)

(73) Assignee: MAN Turbo AG, Oberhausen (DE)

( * ) Notice: Subject to any disclaimer, the term of this patent is extended or adjusted under 35 U.S.C. 154(b) by 594 days.

(21) Appl. No.: 12/545,545

(22) Filed: Aug. 21, 2009

(65) Prior Publication Data
US 2010/0060014 A1 Mar. 11, 2010

(30) Foreign Application Priority Data
Sep. 10, 2008 (DE) .......................... 10 2008 046 509

(51) Int. Cl.
| | | |
|---|---|---|
| F02D 25/00 | (2006.01) | |
| F02D 29/06 | (2006.01) | |
| F01K 23/06 | (2006.01) | |
| F02B 41/10 | (2006.01) | |
| F01K 15/04 | (2006.01) | |

(52) U.S. Cl.
CPC ............... *F02B 41/10* (2013.01); *F01K 23/065* (2013.01); *F01K 15/04* (2013.01); *Y02T 10/163* (2013.01)
USPC .................... 290/4 A; 290/31; 290/4 R; 290/2

(58) Field of Classification Search
USPC ... 290/2, 4 C, 4 A, 4 D, 4 R, 4 B, 31; 60/671, 60/597; 440/75
See application file for complete search history.

(56) References Cited

U.S. PATENT DOCUMENTS

| | | | | |
|---|---|---|---|---|
| 2,179,370 | A * | 11/1939 | Day ............................... | 290/4 C |
| 2,405,676 | A * | 8/1946 | Strub ........................... | 290/4 D |
| 3,188,479 | A * | 6/1965 | Wood et al. .................. | 290/4 R |
| 3,241,314 | A * | 3/1966 | Fields .......................... | 60/39.15 |
| 3,659,417 | A * | 5/1972 | Grieb ............................ | 60/785 |
| 4,077,748 | A * | 3/1978 | Potz .............................. | 417/319 |
| 4,570,077 | A * | 2/1986 | Lambley ....................... | 290/4 R |
| 5,079,913 | A * | 1/1992 | Kishishita ....................... | 60/597 |
| 5,373,198 | A * | 12/1994 | Lopez Jimenez ............... | 307/68 |

(Continued)

FOREIGN PATENT DOCUMENTS

| | | | | |
|---|---|---|---|---|
| DE | 10 2006 040 857 | | 3/2008 | |
| EP | 246631 | A1 * | 11/1987 | ............. B63H 23/18 |
| WO | WO 2006/072791 | | 7/2006 | |
| WO | WO 2006/072791 | A1 * | 7/2006 | |

*Primary Examiner* — Julio Gonzalez Ramirez
(74) *Attorney, Agent, or Firm* — Cozen O'Connor

(57) ABSTRACT

A device for energy recovery for a large diesel engine includes a current generator for converting mechanical rotational energy into electric energy. The current generator includes input shaft for applying rotational energy; a steam turbine a first shaft for transmitting the rotational energy of the steam turbine to the input shaft of the current generator a power turbine and a second shaft for transmitting the rotational energy of the power turbine to the input shaft of the current generator, wherein the first shaft and the second shaft are coupled with the input shaft of the current generator. A first coupling device between the current generator and the steam turbine couples the input shaft of the current generator and the first shaft and/or a second coupling device between the current generator and the power turbine couples the input shaft of the current generator and the second shaft are provided.

11 Claims, 1 Drawing Sheet

(56) References Cited

U.S. PATENT DOCUMENTS

| | | | |
|---|---|---|---|
| 7,340,897 B2 * | 3/2008 | Zimron et al. | 60/641.1 |
| 2005/0173927 A1 * | 8/2005 | Aukon | 290/43 |
| 2006/0066113 A1 * | 3/2006 | Ebrahim et al. | 290/52 |
| 2006/0089227 A1 * | 4/2006 | Fanselow et al. | 475/248 |
| 2007/0062192 A1 * | 3/2007 | Weber et al. | 60/612 |

* cited by examiner

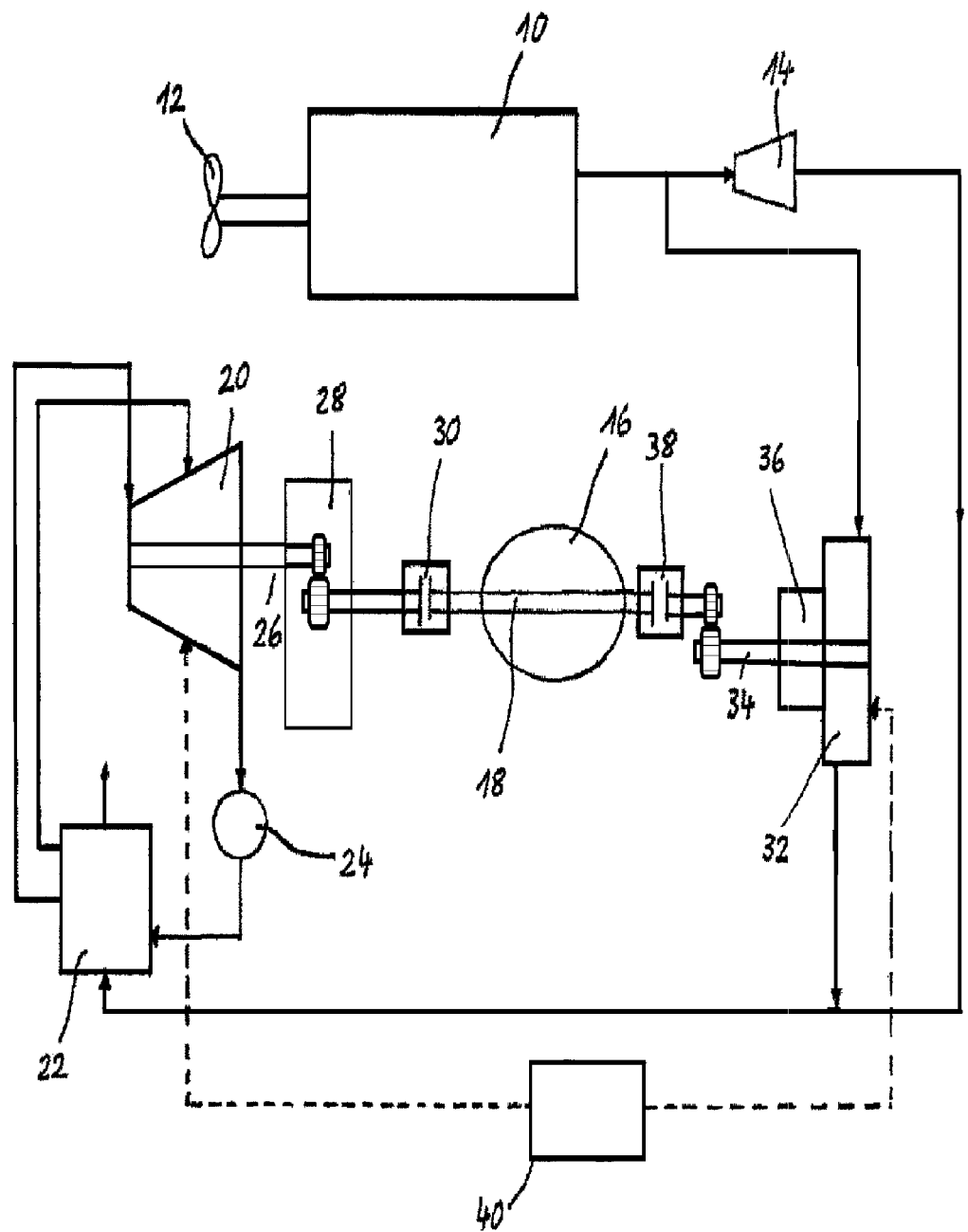

DEVICE FOR ENERGY RECOVERY FOR A LARGE DIESEL ENGINE

BACKGROUND OF THE INVENTION

1. Field of the Invention

The invention relates to a device for energy recovery for a large diesel engine, specifically a large diesel engine on ships and in land-based plants.

2. Description of the Related Art

Electrical consumers on ships are usually supplied with electric energy from an on-board electric network. To lower operating costs, it is usual to generate electric energy from waste heat of a marine engine aided by a four-pole alternator to feed said energy into the on-board network.

It is known from DE 10 2006 040 857 A1 to operate a steam turbine with heat energy of the exhaust gases of a large diesel engine and convert mechanical rotational energy generated by the steam turbine into electric energy in a current generator. The generated energy can then be fed to the on-board network. This publication additionally discloses feeding part of the exhaust gases directly to a power turbine coupled the current generator.

WO 2006/072791 A1 discloses an energy recovery system for a marine diesel engine wherein a current generator is coupled to a steam turbine and a power turbine. The two turbines are connected in series and coupled with an end of the generator shaft. An energy recovery system is additionally described wherein the current generator is positioned between the two turbines. Depending on the particular arrangement, various complex gears for coupling the turbine shafts with the input shaft of the four-pole current generator are required, since the rotational speeds of the individual components differ from one another.

SUMMARY OF THE INVENTION

The present invention is based on creating an improved device for energy recovery for a large diesel engine.

The invention relates to a large diesel engine as they are employed for example on ships and in land-based plants and highly charged large diesel engines preferentially for heavy oil operation.

A device for energy recovery for a large diesel engine according to one embodiment of the invention comprises a current generator for converting mechanical rotational energy into electric energy, wherein the current generator comprises an input shaft for applying rotational energy; a first turbine for generating mechanical rotational energy; a first shaft for transmitting the rotational energy of the first turbine to the input shaft of the current generator; a second turbine for generating mechanical rotational energy; and a second shaft for transmitting the rotational energy of the second turbine to input shaft of the current generator, wherein the first shaft and the second shaft are coupled with averted sides of the input shaft of the current generator. In addition, a first coupling device between the current generator and the first turbine for establishing and separating the coupling between the input shaft of the current generator and the first shaft and/or a second coupling device between the current generator and the second turbine for establishing and separating the coupling between the input shaft of the current generator and the second shaft are provided.

Through the arrangement of the two turbines on opposite sides of the input shaft of the current generator and the provision of the coupling devices between the turbines and the current generator it is possible in an advantageous manner to drive the current generator optionally by both turbines or only by one of the two turbines, depending on the immediate requirements and circumstances.

In one embodiment of the invention the first turbine is a steam turbine, wherein steam is generated with the help of heat energy from exhaust gases of the large diesel engine, and the second turbine is a power turbine which is operated with the help of the flow energy of exhaust gases of the large diesel engine.

In a preferred embodiment of the invention, a single-stage spur gear is arranged between the current generator and the first turbine. This is substantially simpler and more compact than the conventionally employed multi-stage gears which are frequently necessary because of the lower rotational speed of multi-pole alternators.

Similarly a single-stage spur gear is preferentially arranged between the current generator and the second turbine.

In a further embodiment of the invention the current generator is designed as a two-pole alternator. By using a two-pole alternator operated with a suitably higher rotational speed than for example a four-pole alternator, which is conventionally employed in connection with marine diesel engines, the gears between the current generator and the two turbines, which rotate with a significantly higher rotational speed, can be designed simpler and more compact.

A common control and regulating device for the manual and/or automatic controlling of both the operation of the first turbine as well as the operation of the second turbine dependent on the current demand is preferentially provided.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above and additional features and advantages will be better understood from the following description of a preferred exemplary embodiment by means of the enclosed drawing.

FIG. 1 is a block diagram of an energy recovery device for a large diesel engine according to the present invention.

DETAILED DESCRIPTION OF THE PRESENTLY PREFERRED EMBODIMENTS

The invention is described in the following example of an energy recovery device for a large diesel engine on a ship. The present invention however can also be applied similarly to large diesel engines in land-based plants.

The large diesel engine (e.g. two-stroke diesel engine) 10 drives a ship's propeller 12 via a shaft. In the exhaust gas train of the large diesel engine 10 an (exhaust) turbocharger 14 is arranged in known manner.

The main component of the energy recovery device is a current generator 16 which is preferentially designed as two-pole alternator and comprises an input shaft 18 for applying rotational energy. This current generator 16 converts mechanical rotational energy applied to its input shaft into electric energy which can be fed into the on-board network of the ship to supply electrical consumers with energy.

The current generator 16 is preferably adapted to the respective on-board network. For example, for an on-board network with a network frequency of 60 Hz the rotational speed of the two-pole alternator 16 is approximately 3600 rpm, for an on-board network with a network frequency of 50 Hz, approximately 3000 rpm.

On one side (left in FIG. 1) of the current generator 16 a steam turbine 20 is arranged as a first turbine. Steam turbine 20 is part of a water/steam circuit that comprises a heat exchanger 22 and a condenser 24. The hot exhaust gas flow of the large diesel engine 10 is directed through the heat exchanger 22 of the water/steam circuit to transmit heat energy to the working medium of this circuit, preferentially water, as a result of which the water is evaporated. The generated steam is supplied to a low-pressure side or a high-pressure side of the steam turbine 20 and expanded therein. During this expansion of the steam its energy is converted into mechanical energy with which a first shaft 26 is rotated.

This first shaft 26 is provided with a first gear device 28 which preferentially is designed as a single-stage spur gear and has a gear ratio from approximately 1.8 to 8 and preferably in the range from approximately 2 to 5.

The first shaft 26 is coupled, usually an end, of the input shaft 18 of the current generator 16. According to one embodiment of the invention, a first coupling device 30 is provided to couple the first shaft 26 of the steam turbine 20 and the input shaft 18 of the current generator 16. This first coupling device 30 is preferably a clutch coupling or an overrunning clutch.

On the other side of the current generator 16 (right in FIG. 1) a power turbine 32 is arranged as a second turbine. A part of the exhaust gas flow of the large diesel engine 10 is fed directly to power turbine 32 to convert its flow energy into mechanical rotational energy with which a second shaft 34 is rotated.

The second shaft 34 is provided with a second gear device 36 which is preferentially designed as a single-stage spur gear. The second gear device 36 preferably has a gear ratio in the range from approximately 6 to 12, preferably from approximately 8 to 10.

Similar to the first shaft 26, the second shaft 34 is also coupled to the input shaft 18 of the current generator 16. According to one embodiment of the invention, a second coupling device 38 is provided for coupling between second shaft 34 of the power turbine 32 and the input shaft 18 of the current generator 16. This second coupling device 38 is preferably a clutch coupling or an overrunning clutch.

A more detailed description of the construction and the operation of the steam turbine 20 and the power turbine 32 is omitted since the energy recovery device of the invention can work with any types and embodiments of the two turbines 20, 32 and is not restricted in this regard.

As illustrated in FIG. 1 the first and the second turbine 20, 32 and the shafts 26, 34 are coupled to operate sides or ends of the current generator 16, more specifically its input shaft 18. If the current generator 16 is embodied as two-pole alternator and thus rotates with higher rotational speeds, the second gear device 36 on the second shaft 34 of the power turbine 32 is designed in advantageous manner as reliable and more cost-effective single-stage spur gear.

With larger diesel engines for outputs of more than approximately 40 MW a four-pole alternator can be employed as the current generator 16. The rotational speeds of such a four-pole alternator in each case amount to half of the values stated above for the two-pole alternator. Since with such more powerful diesel engines 10 the power turbine 32 rotates with lower rotational speeds, the second gear device 36 between a four-pole alternator 16 and the power turbine 32 can be embodied as single-stage spur gear in this case.

Due to the arrangement of the first and the second coupling device 30, 38 between the input shaft 18 of the current generator 16 and the first shaft 26 of the steam turbine 20 or the second shaft 34 of the power turbine 32, depending on the immediate requirements and circumstances (e.g. operating state of the large diesel engine, operating states of the two turbines, energy requirement of the on-board networking, etc.), it is possible to optionally drive the current generator 16 parallel with the help of both turbines 20, 32 or only with the steam turbine 20 or the power turbine 32. This has the advantage that upon failure of a turbine (e.g. for the purpose of maintenance or repair) the current generator 16 can continue to be driven with the other turbine.

As is also indicated in FIG. 1, a control and regulating device 40 is provided which is designed as a common control and regulating device for both turbines 20, 32. In other words, this control and regulating device 40 controls the switching on and switching off as well as the rotational speeds and outputs both of the steam turbine 20 as well as the power turbine 32, either manually and/or automatically, depending on the current requirement and state of the energy recovery system.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An energy recovery device comprising:
an engine;
a current generator configured for converting mechanical rotational energy into electric energy, the current generator including an input shaft having first and second opposite ends configured for applying rotational energy;
a first turbine configured for generating mechanical rotational energy;
a first shaft coupled to the first end of the input shaft configured for transmitting the rotational energy of the first turbine to the first input shaft of the current generator;
a second turbine for generating mechanical rotational energy;
a second shaft coupled to the second end of the input shaft for transmitting the rotational energy of the second turbine to the input shaft of the current generator;
a first coupling device arranged between the current generator and the first turbine for making and breaking the coupling between the first end of the input shaft of the current generator and the first shaft;
a second coupling device between the current generator and the second turbine for making and breaking the coupling between the second end of the input shaft of the current generator and the second shaft; and at least one of:
  a first single-stage spur gear arranged between the current generator and the first turbine and
  a second single-stage spur gear arranged between the current generator and the second turbine.

2. The energy recovery device according to claim 1, wherein the first turbine is a steam turbine the steam being generated at least in part by heat energy from exhaust gases of the engine.

3. The energy recovery device according to claim 1, wherein the second turbine is a power turbine operated at least in part on flow energy from exhaust gases of the engine.

4. The energy recovery device according to claim 1, wherein the current generator is a two-pole alternator.

5. The energy recovery device according to claim 1, further comprising a common control and regulating device configured for controlling operation of the first turbine and the second turbine.

6. The energy recovery device according to claim 1, wherein the current generator is a four-pole alternator.

7. The energy recovery device according to claim 1, wherein the second single-stage spur gear has a gear ratio of 6 to 12.

8. The energy recovery device according to claim 7, wherein the second single-stage spur gear has a gear ratio of 8 to 10.

9. The energy recovery device according to claim 1, wherein the first turbine is a steam turbine and the second turbine is a gas turbine.

10. An energy recovery device comprising:
an engine;
a current generator configured for converting mechanical rotational energy into electric energy, the current generator including an input shaft having first and second opposite ends configured for applying rotational energy;
a first turbine configured for generating mechanical rotational energy;
a first shaft coupled to the first end of the input shaft configured for transmitting the rotational energy of the first turbine to the first input shaft of the current generator;
a second turbine for generating mechanical rotational energy;
a second shaft coupled to the second end of the input shaft for transmitting the rotational energy of the second turbine to the input shaft of the current generator;
a first coupling device arranged between the current generator and the first turbine for making and breaking the coupling between the first end of the input shaft of the current generator and the first shaft;
a second coupling device between the current generator and the second turbine for making and breaking the coupling between the second end of the input shaft of the current generator and the second shaft;
a first single-stage spur gear arranged between the current generator and the first turbine, wherein the first single-stage spur gear has a gear ratio of 1.8 to 8; and
a second single-stage spur gear having a gear ratio of 6 to 12 arranged between the current generator and the second turbine.

11. The energy recovery device according to claim 10, wherein the first single-stage spur gear has a gear ratio of 2 to 5.

* * * * *